United States Patent
Fröberg Olsson et al.

(10) Patent No.: US 10,594,378 B2
(45) Date of Patent: Mar. 17, 2020

(54) WIRELESS DEVICE, A NETWORK NODE AND METHODS THEREIN FOR DETERMINING CHANNEL STATE MEASUREMENTS IN A WIRELESS COMMUNICATIONS NETWORK

(71) Applicant: Telefonaktiebolaget LM Ericsson (publ), Stockholm (SE)

(72) Inventors: Jonas Fröberg Olsson, Ljungsbro (SE); Martin Hessler, Linköping (SE); Andreas Bergström, Vikingstad (SE); Pål Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/543,384

(22) PCT Filed: Oct. 12, 2015

(86) PCT No.: PCT/SE2015/051082
§ 371 (c)(1),
(2) Date: Jul. 13, 2017

(87) PCT Pub. No.: WO2017/065653
PCT Pub. Date: Apr. 20, 2017

(65) Prior Publication Data
US 2017/0373744 A1  Dec. 28, 2017

(51) Int. Cl.
*H04B 7/06* (2006.01)
*H04B 7/0456* (2017.01)
(Continued)

(52) U.S. Cl.
CPC .......... *H04B 7/0626* (2013.01); *H04B 7/024* (2013.01); *H04B 7/0456* (2013.01);
(Continued)

(58) Field of Classification Search
CPC .... H04B 7/0626; H04B 7/024; H04B 7/0456; H04L 1/0026; H04W 72/1231; H04W 24/10
See application file for complete search history.

(56) References Cited

U.S. PATENT DOCUMENTS

| 9,681,425 | B2 * | 6/2017 | Geirhofer | H04B 7/0621 |
| 2010/0323720 | A1 * | 12/2010 | Jen | H04B 7/2606 455/456.1 |

(Continued)

OTHER PUBLICATIONS

Alcatel-Lucent et al., "R1-110219: Periodic CQI/PMI/RI reporting in case of multiple DL CCs," 3rd Generation Partnership Project (3GPP), TSG-RAN WG1 #63bis, Jan. 17-21, 2011, 2 pages, Dublin Ireland.

(Continued)

*Primary Examiner* — Redentor Pasia
(74) *Attorney, Agent, or Firm* — Withrow & Terranova, PLLC

(57) ABSTRACT

A method performed by a wireless device for determining channel state measurements in a wireless communications network is provided. The wireless device obtains at least two channel state measurements performed by the wireless device on measurement resources allocated for the at least two channel state measurements. The wireless device also receives information indicating how the wireless device is to combine the obtained at least two channel state measurements into at least one combined channel state measurement. Then, the wireless device determines at least one combined channel state measurement based on the received information and the obtained at least two channel state measurements. A wireless device for determining channel state measurements in a wireless communications network is also provided. Further, a network node and a method therein for enabling a wireless device to determine channel state (Continued)

measurements in a wireless communications network are also provided.

25 Claims, 8 Drawing Sheets

(51) Int. Cl.
| H04B 7/024 | (2017.01) |
| H04L 1/00 | (2006.01) |
| H04W 52/24 | (2009.01) |
| H04W 24/10 | (2009.01) |
| H04W 72/12 | (2009.01) |
| H04B 7/0452 | (2017.01) |
| H04L 5/00 | (2006.01) |

(52) U.S. Cl.
CPC ........... *H04L 1/0026* (2013.01); *H04W 24/10* (2013.01); *H04W 52/243* (2013.01); *H04W 72/1231* (2013.01); *H04B 7/0452* (2013.01); *H04L 5/0007* (2013.01)

(56) References Cited

U.S. PATENT DOCUMENTS

| 2012/0213113 | A1* | 8/2012 | Zhao | H04B 7/0626 370/252 |
| 2012/0218969 | A1* | 8/2012 | Tan | H04L 5/005 370/329 |
| 2013/0242769 | A1* | 9/2013 | Hammarwall | H04L 5/0016 370/252 |
| 2014/0112173 | A1* | 4/2014 | Hammarwall | H04L 1/0026 370/252 |
| 2014/0133336 | A1* | 5/2014 | Park | H04W 24/10 370/252 |
| 2015/0280877 | A1* | 10/2015 | Chen | H04L 5/0048 370/252 |
| 2015/0288499 | A1* | 10/2015 | Nam | H04L 1/0026 370/329 |
| 2015/0341942 | A1* | 11/2015 | Lee | H04B 7/0626 370/252 |
| 2017/0188371 | A1* | 6/2017 | Kim | H04W 24/10 |
| 2018/0175985 | A1* | 6/2018 | Park | H04L 5/0048 |

OTHER PUBLICATIONS

Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.11.0, 3GPP Organizational Partners, Mar. 2015, 356 pages.

International Search Report and Written Opinion for International Patent Application No. PCT/SE2015/051082, dated Jun. 10, 2016, 13 pages.

International Preliminary Report on Patentability for International Patent Application No. PCT/SE2015/051082, dated Dec. 21, 2017, 7 pages.

Written Opinion for International Patent Application No. PCT/SE2015/051082, dated Sep. 19, 2017, 7 pages.

* cited by examiner

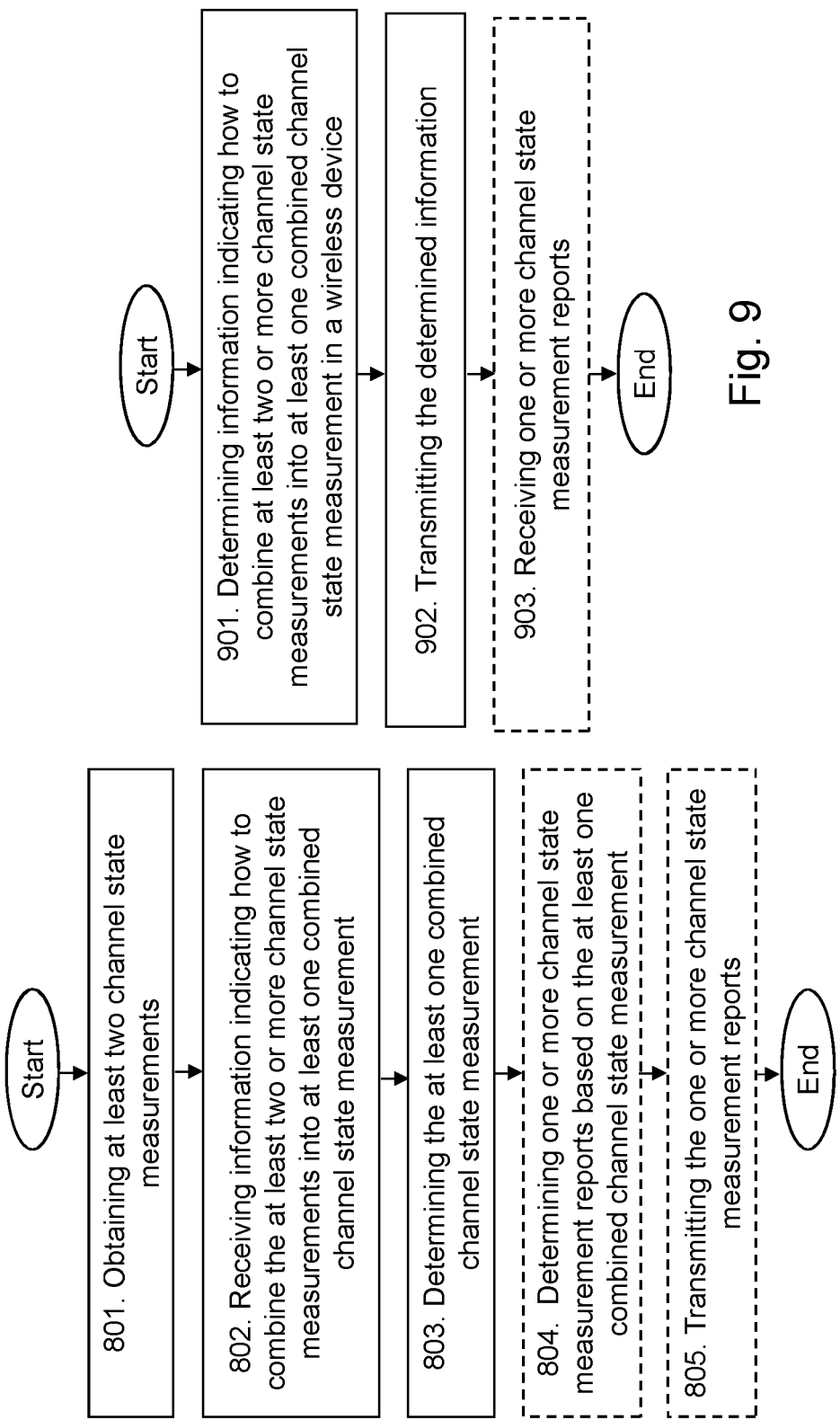

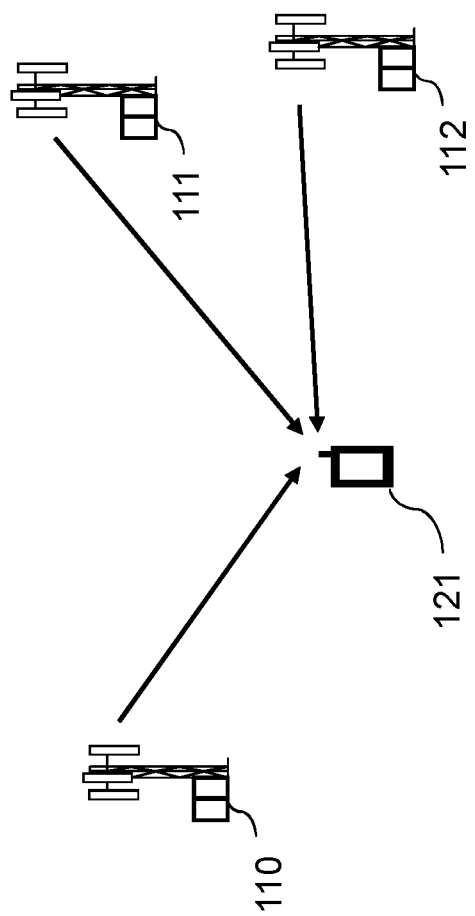

WIRELESS DEVICE, A NETWORK NODE AND METHODS THEREIN FOR DETERMINING CHANNEL STATE MEASUREMENTS IN A WIRELESS COMMUNICATIONS NETWORK

This application is a 35 U.S.C. § 371 national phase filing of International Application No. PCT/SE2015/051082, filed Oct. 12, 2015, the disclosure of which is incorporated herein by reference in its entirety.

TECHNICAL FIELD

Embodiments herein relate to channel state measurements in a wireless communications network. In particular, embodiments herein relate to a wireless device and method therein for determining channel state measurements in a wireless communications network, as well as, a network node and method therein for enabling a wireless device to determine channel state measurements in a wireless communications network.

BACKGROUND

In today's wireless communications networks a number of different technologies are used, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible technologies for wireless communication. A wireless communications network comprises radio base stations providing radio coverage over at least one respective geographical area forming a cell. The cell definition may also incorporate frequency bands used for transmissions, which means that two different cells may cover the same geographical area but using different frequency bands. Wireless devices, also referred to herein as User Equipments, UEs, mobile stations, and/or wireless terminals, are served in the cells by the respective radio base station and are communicating with respective radio base station. The wireless devices transmit data over an air or radio interface to the radio base stations in uplink, UL, transmissions and the radio base stations transmit data over an air or radio interface to the wireless devices in downlink, DL, transmissions.

Long Term Evolution, LTE, is a Frequency Division Multiplexing technology wherein Orthogonal Frequency Division Multiplexing, OFDM, is used in DL transmissions from a radio base station to a wireless device and Discrete Fourier Transform spread, DFT-spread OFDM is used in UL transmissions from a wireless device to a radio base station. FIGS. 1-3 provide an overview of LTE downlink transmissions.

FIG. 1 illustrates the basic LTE physical resource which may be seen as a time-frequency grid, where each resource element corresponds to one subcarrier during one OFDM symbol interval (on a particular antenna port). As shown in FIG. 1, in the time domain, LTE downlink transmissions are organized into radio frames of 10 ms, each radio frame consisting of ten equally-sized subframes of 1 ms as illustrated in FIG. 2. A subframe is divided into two slots, each of 0.5 ms time duration.

As shown in FIG. 2, the resource allocation in LTE is described in terms of resource blocks, where a resource block corresponds to one slot in the time domain and 12 contiguous 15 kHz subcarriers in the frequency domain. Two in time consecutive resource blocks represent a resource block pair and correspond to the time interval upon which scheduling operates.

Transmissions in LTE are dynamically scheduled in each subframe where the base station transmits downlink assignments/uplink grants to certain wireless devices via the Physical Downlink Control Channel, PDCCH. The PDCCHs are transmitted in the first OFDM symbol(s) in each subframe and spans (more or less) the whole system bandwidth. Alternatively or additionally, enhanced PDCCHs, ePDCCHs, may be employed in LTE in which extended control regions are reserved for the transmission of downlink assignments/uplink grants. The ePDCCH is frequency multiplexed with scheduled data transmissions and uses dedicated demodulation reference signals for enhanced beamforming support. Hence, a UE that has decoded a downlink assignment, carried by a PDCCH and/or ePDCCH, knows which resource elements in the subframe that contain data aimed for the wireless device. Similarly, upon receiving an uplink grant, the wireless device knows which time/frequency resources it should transmit upon. In LTE downlink, data is carried by the Physical Downlink Shared Channel, PDSCH, and in the uplink the corresponding channel is referred to as the Physical Uplink Shared Channel, PUSCH.

Demodulation of sent data requires estimation of the radio channel which is done by using transmitted Reference Symbols, RS, i.e. symbols known by the receiver. In LTE, Cell-specific Reference Symbols, CRS, are transmitted in all downlink subframes and in addition to assist downlink channel estimation they may also be used for mobility measurements performed by the wireless devices. LTE also supports UE specific RS aimed only for assisting channel estimation for demodulation purposes. FIG. 3 illustrates how the mapping of physical control/data channels and signals may be done on resource elements within a downlink subframe. In this example, the PDCCHs occupy the first out of three possible OFDM symbols, so in this particular case the mapping of data could start already at the second OFDM symbol. Since the CRS is common to all wireless devices in the cell, the transmission of CRS cannot be easily adapted to suit the needs of a particular wireless device. This is in contrast to UE specific RS which means that each wireless device has RS of its own placed in the data region of FIG. 3 as part of PDSCH.

CSI-RS

As of LTE Release 10, a new RS concept was introduced with separate UE specific RS for demodulation of PDSCH and RS for measuring the channel for the purpose of Channel State Information, CSI, feedback from the wireless device. The latter is referred to as CSI-RS. CSI-RS are not transmitted in every subframe and they are generally sparser in time and frequency than RS used for demodulation. CSI-RS transmissions may occur every 5th, 10th, 20th, 40th, or 80th subframe according to an RRC configured periodicity parameter and an RRC configured subframe offset.

A wireless device operating in connected mode can be requested by the base station to perform CSI reporting, e.g. reporting a suitable rank indicator (RI), one or more precoding matrix indices (PMIs) and a channel quality indicator (CQI). Other types of CSI are also conceivable including explicit channel feedback and interference covariance feedback. The CSI feedback assists the network in scheduling, including deciding the subframe and RBs for the transmission, which transmission scheme/precoder to use, as well as provides information on a proper user bit rate for the transmission, i.e. link adaptation. In LTE, both periodic and aperiodic CSI reporting is supported. In the case of periodic CSI reporting, the wireless device reports the CSI measurements on a configured periodical time basis on the Physical Uplink Control Channel, PUCCH, whereas with aperiodic reporting the CSI feedback is transmitted on the PUSCH at pre-specified time instants after receiving the CSI grant from the base station. With aperiodic CSI reports, the base station may thus request CSI reflecting downlink radio conditions in a particular subframe.

FIGS. 4-6 shows a detailed illustration of which resource elements within a resource block pair may potentially be occupied by the new UE specific RS for demodulation and the CSI-RS. The CSI-RS utilizes an orthogonal cover code to overlay two antenna ports on two consecutive REs. As seen, many different CSI-RS patterns are available. For the case of 2 CSI-RS antenna ports, there are twenty different patterns within a subframe. The corresponding number of patterns is 10 and 5 for 4 and 8 CSI-RS antenna ports, respectively. For TDD, some additional CSI-RS patterns are available. A pattern may in LTE Release 10 correspond to 1, 2, 4, or 8 CSI-RS antenna ports.

Subsequently in this disclosure, the term CSI-RS resource is used to refer to a selection of resource elements corresponding to a CSI-RS. In FIGS. 4-6, for example, the resource elements corresponding to a CSI-RS resource share the same shading. In such a case, a resource corresponds to a particular pattern present in a particular subframe. Thus two different patterns in the same subframe or the same CSI-RS pattern but in different subframes in both cases constitute two separate CSI-RS measurement resources. In LTE Release 10, a CSI-RS resource can alternatively be thought of being pointed out by a combination of "resource-Config" and "subframeConfig" which are configured by higher layers.

The CSI-RS patterns may also correspond to so-called zero-power CSI-RS, also referred to as muted REs. Zero-power CSI-RS corresponds to a CSI-RS pattern whose REs are silent, i.e. there is no transmitted signal on those REs. In other words, the zero-power CSI-RS are such that wireless device should not assume PDSCH energy in those REs. There may, and typically are, signals on those REs but those REs are not intended for the wireless device. These silent patterns are configured with a resolution corresponding to the four antenna port CSI-RS patterns. Hence, the smallest unit to silence corresponds to four REs.

One purpose of zero-power CSI-RS is to raise the SINR for CSI-RS in a cell by configuring zero-power CSI-RS in interfering cells so that the REs otherwise causing the interference are silent, which will improve channel estimation. Another purpose is to enable the wireless device to perform interference measurements. Thus, a CSI-RS pattern in a certain cell is matched with a corresponding zero-power CSI-RS pattern in interfering cells.

Raising the SINR level for CSI-RS measurements is particularly important in applications such as Coordinated Multi Point, CoMP, transmissions or in heterogeneous deployments. In CoMP, the wireless device is likely to need to measure the channel from non-serving points and interference from the much stronger serving point. Zero-power CSI-RS is also needed in heterogeneous deployments where zero-power CSI-RS in the macro-layer is configured so that it coincides with CSI-RS transmissions in the pico-layer. This avoids strong interference from macro nodes when wireless devices measure the channel to a pico node.

The PDSCH is mapped around the REs occupied by CSI-RS and zero-power CSI-RS in which case it is important that both the network and the wireless device are assuming the same CSI-RS/zero power CSI-RS configuration or else the wireless device is unable to decode the PDSCH in subframes containing CSI-RS or their zero-power counterparts. However, in some cases, the network and the wireless device may not be assuming the same CSI-RS/zero power CSI-RS configuration. For example, the network may transmit PDSCH (not intended for the wireless device) or CSI-RS in REs defined for the wireless device as zero-power, which may very well be a desired way to operate. However, it is important that the network is operating in the intended way implied by how the wireless device is configured.

Wireless device using Transmission Mode 10, TM10, may also be configured to report CSI for multiple CSI-processes, wherein each CSI-process may have different CSI-measurement resources. A CSI process comprises a CSI-RS measurement resource and a CSI Interference Measurement, CSI-IM, resource.

CSI Feedback for CoMP

To assist scheduling and link adaptation when performing CoMP, it is useful to let the wireless device feedback CSI corresponding to the channels of multiple transmission points back to the network node. Such feedback allows the network node to take the multiple transmission points into account, i.e. to assess the impact that these will have on the performance of scheduling a wireless device on a certain resource and with a certain precoder. This may then be exploited for devising efficient scheduling strategies across multiple transmission points.

In a typical CoMP scenario, two or more network nodes, which also may be referred to as Transmission Points or TPs hereinafter, may perform transmissions in a coordinated manner to a number of wireless devices in a wireless communications network. In such a CoMP scenario, accurate CSI for an intended transmission from one network node to one wireless device is a CSI that resembles the interference situation for that particular transmission. However, the interference situation for this particular transmission mainly depends on if other network nodes are also transmitting at the same time or if they are silent, i.e. muted.

For example, assume three network nodes, TP1, TP2, TP3, that are part of a coordinated cluster configured to perform CoMP transmissions, whereby a transmission scheduler for the CoMP transmissions, e.g. located in one of the three network nodes, requires to obtain accurate CSI for a transmission from the network node TP1 to a wireless device. In this case, an accurate CSI would then be a CSI according to one of the following CSI hypothesis:

CSI1: TP2 and TP3 both transmit
CSI2: TP2 transmit and TP3 muted
CSI3: TP2 muted and TP3 transmit
CSI4: TP2 and TP3 muted To get a CSI for all these CSI hypothesis, the wireless device is required to be configured with four CSI processes, whereby each CSI-process is configured with a CSI-IM resource on which the desired interference may be estimated. However, such a scheme to obtain accurate CSI within a coordinated cluster of network nodes configured to perform CoMP transmissions will consume a large amount of CSI-RS measurement resources in the wireless communications network.

SUMMARY

It is an object of embodiments herein to improve channel state measurements in a wireless communication network.

According to a first aspect of embodiments herein, the object is achieved by a method performed by a wireless device for determining channel state measurements in a wireless communications network. The wireless device obtains at least two channel state measurements performed by the wireless device on measurement resources allocated for the at least two channel state measurements. Also, the wireless device receives information indicating how the wireless device is to combine the obtained at least two channel state measurements into at least one combined channel state measurement. Then, the wireless device determines at least one combined channel state measurement based on the received information and the obtained at least two channel state measurements.

According to a second aspect of embodiments herein, the object is achieved by a wireless device for determining channel state measurements in a wireless communications network. The wireless device is configured to obtain at least two channel state measurements performed by the wireless device on measurement resources allocated for the at least two channel state measurements. The wireless device is also configured to receive information indicating how the wireless device is to combine the obtained at least two channel state measurements into at least one combined channel state measurement. The wireless device is further configured to then determine at least one combined channel state measurement based on the received information and the obtained at least two channel state measurements.

According to a third aspect of embodiments herein, the object is achieved by a method performed by a network node for enabling a wireless device to determine channel state measurements in a wireless communications network. The network node determines information indicating how to combine at least two channel state measurements into at least one combined channel state measurement in the wireless device, wherein the at least two channel state measurements are obtained by the wireless device on measurement resources allocated by the network node for the at least two channel state measurements. The network node also transmits the determined information to the wireless device in the wireless communications network.

According to a fourth aspect of embodiments herein, the object is achieved by a network node for enabling a wireless device to determine channel state measurements in a wireless communications network. The network node is configured to determine information indicating how to combine at least two channel state measurements into at least one combined channel state measurement in the wireless device, wherein the at least two channel state measurements are obtained by the wireless device on measurement resources allocated by the network node for the at least two channel state measurements. The network node is also configured to then transmit the determined information to the wireless device in the wireless communications network.

By providing information on how at least one combined channel state measurement may be determined from at least two obtained channel state measurements, the wireless device may use channel state measurement resources of a single channel state measurement process to determine accurate interference contributions from different network nodes, beams or antennas on transmissions from a network node to the wireless device in the wireless communications network. This will reduce the amount of channel state measurement resources that is required for channel state measurements in the wireless communications network. Hence, the channel state measurements in the wireless communications network is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 8 is a flowchart depicting embodiments of a method in a wireless device, FIG. 9 is a flowchart depicting embodiments of a method in a network node, FIG. 10 is a schematic block diagram illustrating embodiments of a network node and a wireless device in a wireless communications network.

DETAILED DESCRIPTION

Figure 1:
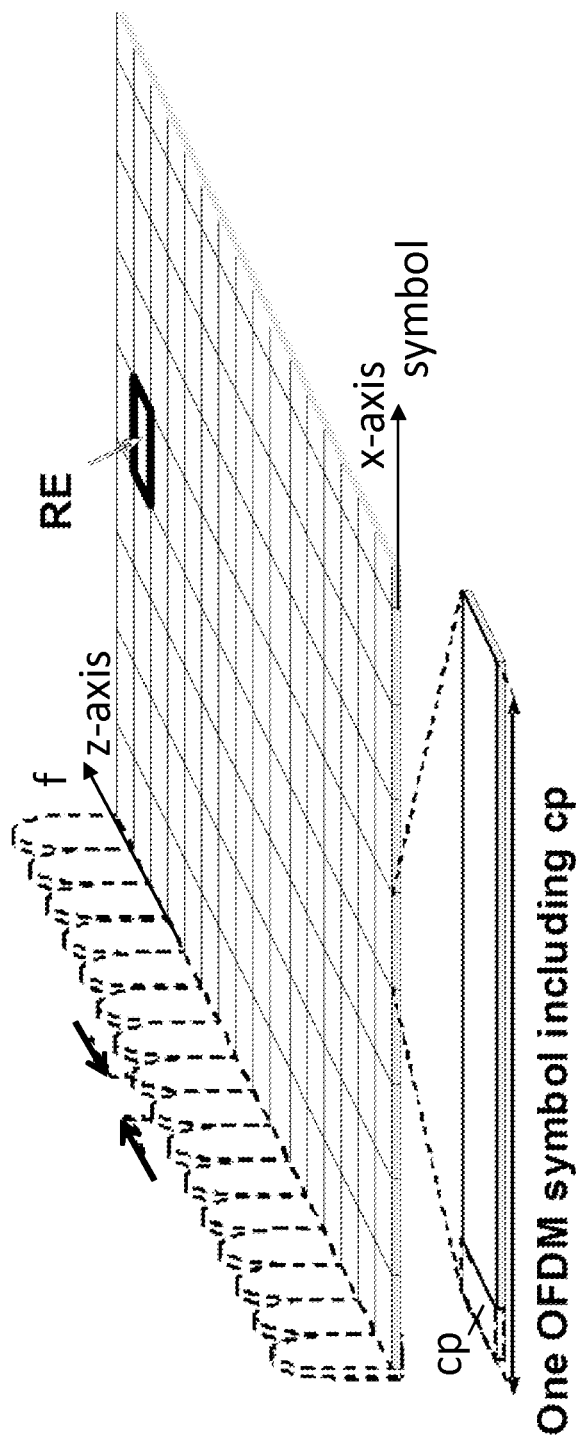
FIG. 1 is a schematic block diagram of a LTE downlink physical resource.
Figure 2:
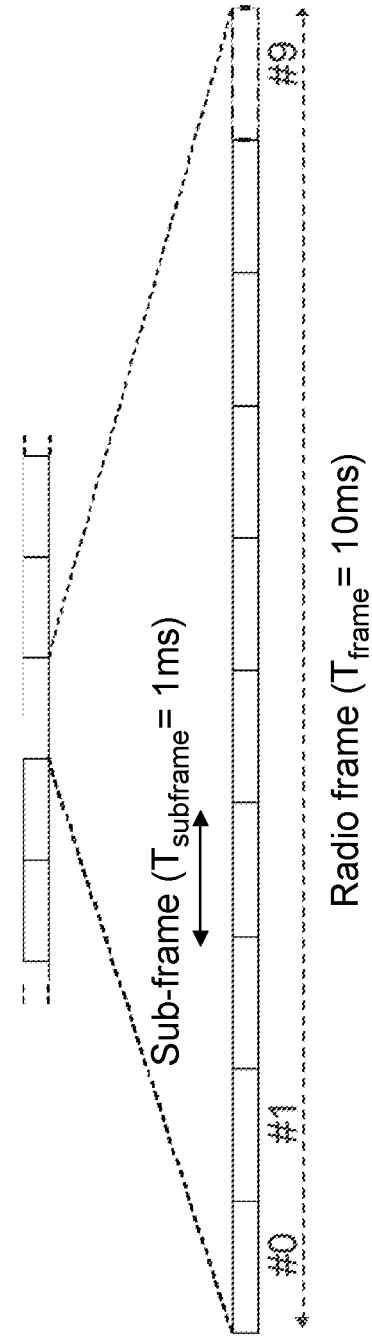
FIG. 2 is a schematic overview depicting radio frames.
Figure 3:
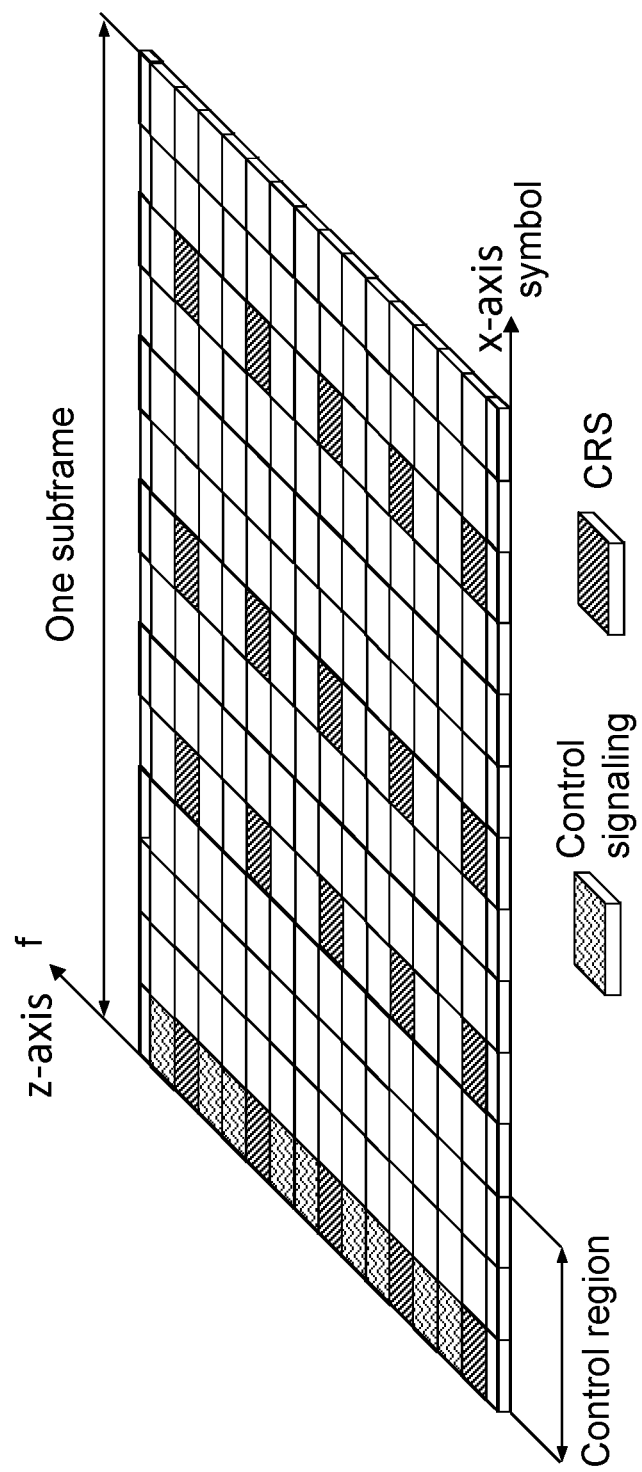
FIG. 3 is a schematic overview depicting a DL subframe.
Figure 4:
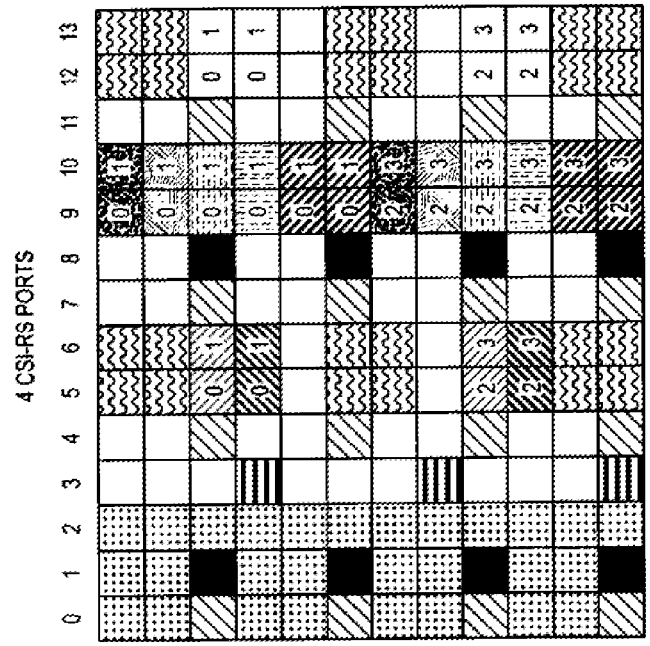
FIGS. 4-6 illustrates a plurality of example resources subframes and the locations of CSI-RS within those subframes.
Figure 5:
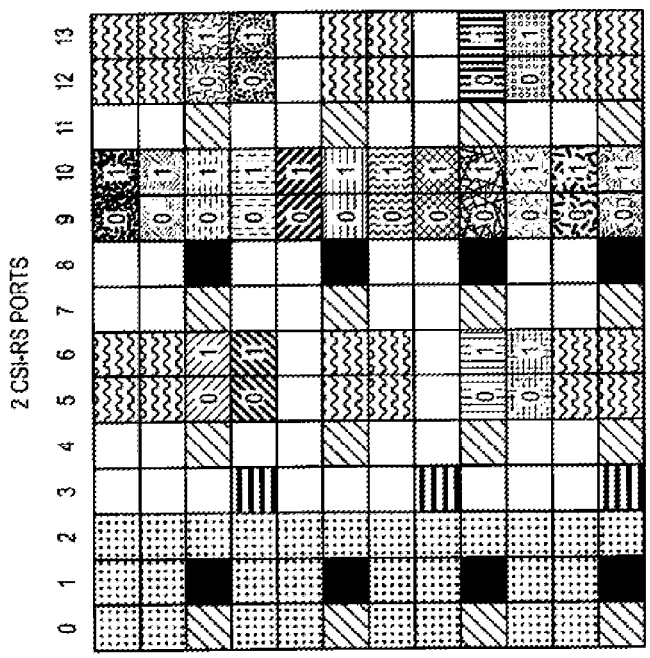
Figure 6:
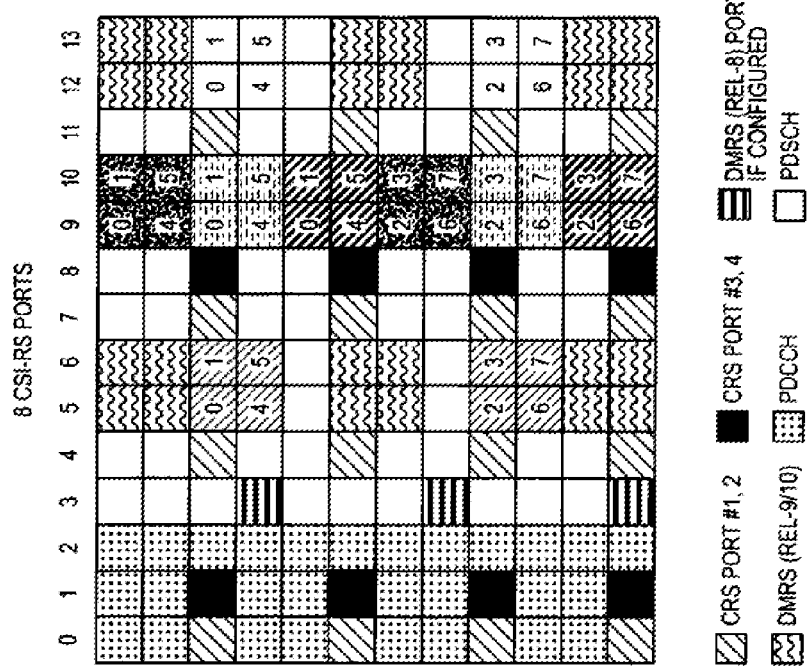

The figures are schematic and simplified for clarity, and they merely show details which are essential to the understanding of the embodiments presented herein, while other details have been left out. Throughout, the same reference numerals are used for identical or corresponding parts or steps.

As part of understanding and developing the embodiments described herein, further issues will first be identified and discussed in more detail.

A described above by the example in the background, one issue is that schemes to obtain accurate CSI within a coordinated cluster of network nodes configured to perform CoMP transmissions will consume a large amount of CSI-RS measurement resources in the wireless communications network. One such scheme is described below in which the CSI-IM measurement resources are configured for each respective CSI process in order to attempt to obtain accurate CSI for a transmission from the network node TP1 to a wireless device.

CSI process 1 (TP2 and TP3 both transmit):
Wireless devices served by TP2 and TP3, i.e. receiving transmissions from TP2 and TP3, are configured with Non-Zero-Power, NZP, CSI-RS measurement resources that coincide with the CSI-IM measurement resources for CSI process 1 for the wireless device.

CSI process 2 (TP2 transmit and TP3 muted):
Wireless devices served by TP2 are configured with NZP CSI-RS measurement resources and wireless devices served by TP3 are configured with Zero-Power, ZP, CSI-RS measurement resources that coincide with the CSI-IM measurement resources for CSI process 2 for the wireless device.

CSI process 3 (TP2 muted and TP3 transmit):
Wireless devices served by TP2 are configured with ZP CSI-RS measurement resources and wireless devices served by TP3 with NZP CSI-RS measurement resources that coincide with the CSI-IM measurement resources for CSI process 3 for the wireless device.

CSI process 4 (TP2 and TP3 muted):

Wireless devices served by TP2 and TP3 are configured with ZP CSI-RS measurement resources that coincide with the CSI-IM measurement resources for CSI process 4 for the wireless device.

Here, the wireless device will simply measure interference on the CSI-IM measurement resources, while the network node will, according to a specific configuration, make suitable transmissions on these CSI-IM measurement resources so that the wireless device will perform the correct interference measurements for each one of the four CSI processes, i.e. interference measurements that are aligned with the above desired CSI hypothesis.

Furthermore, this also means that each of the three network nodes TP1, TP2, TP3 first requires to be associated with one CSI-RS measurement resource used for performing channel estimation. This will consume 3 CSI-RS measurement resources in the wireless communications network. Secondly, there needs to be 4 different CSI-IM measurement resources, that is, one for each of the 4 CSI processes, for each of the three network nodes. Here, however, some of these CSI-IM measurement resources are desired to measure same interference situation and may hence utilize same CSI-RS measurement resources.

This means that, for two antenna ports where each CSI-RS measurement resource and CSI-IM measurement resource consumes 2 REs, the minimum number of CSI-IM measurement resources for this scheme is in fact 4 CSI-RS measurement resources if the CSI-RS measurement resources used for channel estimation are also used for interference estimation, that is, for wireless devices served by other network nodes. Therefore, all in all, this scheme will consume 4 CSI-RS measurement resources and 4 CSI-IM measurement resources. Hence, an alternative solution is rather resource consuming and therefore not scalable in a wireless communications network.

Future Radio Access Technologies, RATs, are expected to support a lot more transmit antennas compared to today's systems, particularly from the network side. For example, in the context of massive MIMO deployment, the number of antennas is expected to be huge, e.g. a single transmission point could have in the order of several hundreds or even thousands of antenna elements. A large, albeit much smaller, number of antennas could potentially also be expected in future wireless devices at high carrier frequencies, since the physical size of the antenna elements at those frequencies can be made very small. This increased number of antenna elements makes it possible to form more directive antenna patterns as compared to what is possible with antenna systems of today. It also means that transmitted and/or received signals may be focused much more efficiently towards the wireless device being served, whilst suppressing the interference from/to other wireless devices. Each such direction is typically referred to as a 'beam', whereas the entire process is commonly referred to as 'beam-forming'. Since the number of beams is expected to be large, there is a need to find scalable solutions for obtaining CoMP CSI between beams, i.e. there is a need to know which beams that may be co-scheduled and which beams that cause too much cross-interference. As described by the example in the background above, to utilize today's CSI configurations would consume far too much resources in the wireless communications network.

These issues are addressed by the embodiments described herein with reference to FIGS. 7-12.

Figure 7:
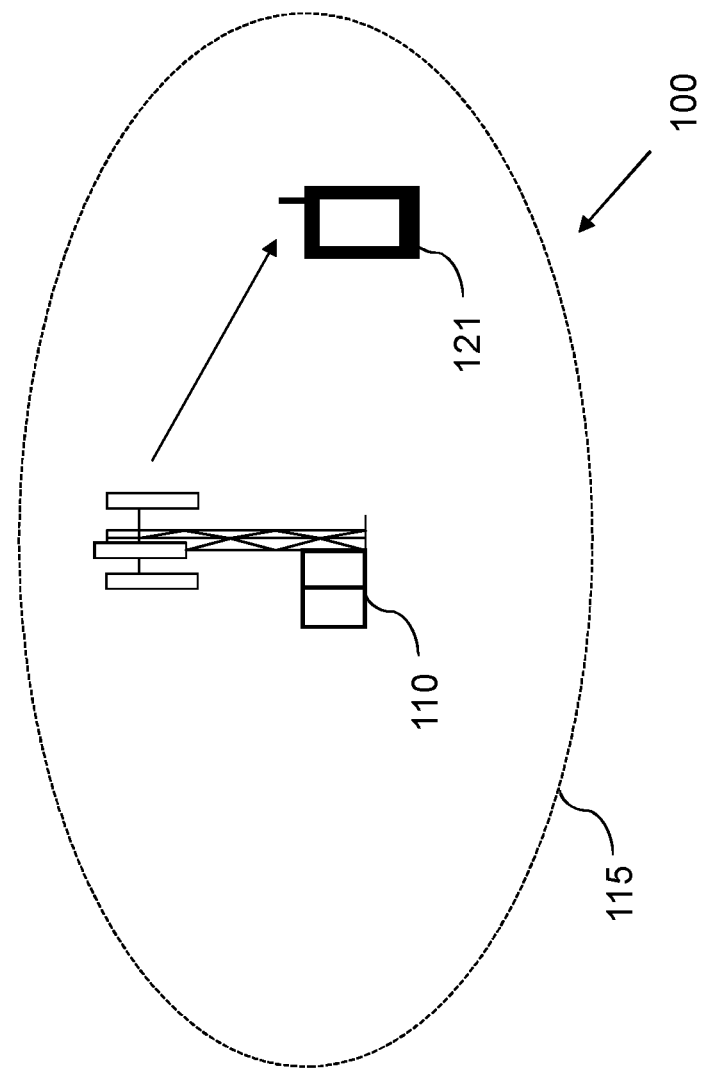
FIG. 7 is a schematic block diagram illustrating embodiments of a network node and a wireless device in a wireless communications network.

FIG. 7 depicts a wireless communications network 100 in which embodiments herein may be implemented. The wireless communications network 100 may be a radio communications network, such as, e.g. LTE, WCDMA, GSM, 3GPP cellular network, or any other cellular network or system. The wireless communications network 100 may also, for example, be referred to as a cellular network or system or a telecommunications network.

The wireless communications network 100 comprises a radio base station, which is referred to herein as a network node 110. The network node 110 is a network unit capable to serve wireless devices which are located within its radio coverage area, i.e. cell 115. The network node 110 may e.g. be an eNB, eNodeB, or a Home Node B, a Home eNode B, femto Base Station (BS), pico BS or any other network unit capable to serve a wireless device or a machine type communication device in the wireless communications network 100.

A wireless device 121 is shown located within the cell 115 which is served by the network node 110. The wireless device 121 is configured to communicate within the wireless communications system 100 via the network node 110 over a radio link when the wireless device 121 is present in the cell 115. The wireless device 121 may be capable of operating or performing measurements in one or more frequencies, carrier frequencies, component carriers or frequency bands. The wireless device 121 may also be interchangeably referred to as a mobile station, a terminal, a wireless terminal, and/or a user equipment, UE. It may here also be pointed out that these terms as used herein should be understood by the skilled in the art as non-limiting terms comprising any wireless device or node equipped with a radio interface allowing for receiving and transmitting signals to or from the network node 110.

For example, the wireless device 121 may, for example, be a mobile terminal or a wireless terminal, a mobile, a mobile phone, a sensor, a computer such as for example a laptop, a Personal Digital Assistant (PDA) or a tablet computer with wireless capability, a wireless terminal used for Machine Type Communication (MTC), a Machine-to-Machine (M2M) communication device, a wireless device used for Device-to-Device (D2D) communication, a fixed or mobile relay or relay node, a device equipped with a wireless interface, such as a printer or a file storage device, or any other radio network unit capable of communicating over a radio link in a wireless communications system 100.

Embodiments of the network node 110, the wireless device 121 and methods therein will be described in more detail below with reference to FIGS. 8-11.

Example of embodiments of a method performed by a wireless device 121 for determining channel state measurements in a wireless communications network 100 will now be described with reference to the flowchart depicted in FIG. 8. FIG. 8 is an illustrated example of actions or operations which may be taken by a wireless device 121 in the wireless communication network 100. The method may comprise the following actions.

Action 801

The wireless device 121 obtains at least two channel state measurements performed by the wireless device 121 on measurement resources allocated for the at least two channel state measurements.

In some embodiments, at least one of the obtained at least two channel state measurements is a channel state measurement for channel estimation. Furthermore, in some embodiments, at least one of the obtained at least two channel state measurements is a channel state measurement for interference estimation. In some embodiments, the measurement resources allocated to the at least one of the obtained at least two channel state measurements that is a channel state measurement for channel estimation may be Channel State Information-Reference Symbol, CSI-RS, resources in the wireless communications network 100. Furthermore, according to some embodiments, the measurement resources allocated to the at least one of the obtained at least two channel state measurements that is a channel state measurement for interference estimation may be Channel State Information-Interference Measurement, CSI-IM, resources in the wireless communications network 100.

In some embodiments, the obtained at least two channel state measurements are part of the same channel state measurement process. The same channel state measurement process may, according to some embodiments, be a Coordinated Multi-Point, CoMP, process. According to some embodiments, the same channel state measurement process may, be a process for performing a joint precoding decision. Furthermore, the same channel state measurement process may, according to some embodiments, be a process for beamforming.

Action 802

In this action, the wireless device 121 receives information indicating how the wireless device 121 is to combine the obtained at least two channel state measurements into at least one combined channel state measurement. In some embodiments, the received information indicate pre-coders and probability distributions for each of the at least one of the obtained at least two channel state measurements that is a channel state measurement for interference estimation. Examples of how these pre-coders and probability distributions may be used to combine the obtained at least two channel state measurements into at least one combined channel state measurement is described in more detail below with reference to FIG. 10.

Action 803

After receiving the information in Action 802, the wireless device 121 determines at least one combined channel state measurement based on the received information and the obtained at least two channel state measurements. This means that the wireless device 121 may use the obtained at least two channel state measurements to create at least one new channel state measurement from the obtained channel state measurements, i.e. the combined state measurement. Here, it should be noted that determining or creating the at least one combined channel state measurement may, for example, comprise a computation, a calculation or a look-up procedure which uses the obtained channel state measurements as input. Also, the determining or creating of the at least one combined channel state measurement may be performed by the wireless device 121 according to the content of the received information, i.e. according to terms or parameters dictated in the received information, such as, e.g. a CSI combining indicator. Examples of how the at least one combined channel state measurement may be determined based on the received information and the obtained at least two channel state measurements is described in more detail below with reference to FIG. 10.

In some embodiments, this may, for example, allow the wireless device 121 to determine accurate interference contributions from different network nodes, beams or antennas on transmissions from the network node 110 to the wireless device 121 in the wireless communications network 100. In some embodiments, this may, for example, allow the wireless device 121 to determine accurate joint transmission channel state measurement from multiple network nodes for transmissions to the wireless device 121 in the wireless communications network 100.

In some embodiments, the at least one combined channel state measurement is a channel state measurement for interference estimation.

Action 804

The wireless device 121 may determine one or more channel state measurement reports based on the at least one combined channel state measurement. In some embodiments, this may, for example, mean that the wireless device 121 determines one or more report which accurately reflects the interference contributions from different network nodes, beams or antennas on transmissions from the network node 110 to the wireless device 121 in the wireless communications network 100. In some embodiments, this may, for example, mean that the wireless device 121 determines one or more reports which comprise accurate joint transmission channel state measurement from multiple network nodes of transmissions to the wireless device 121 in the wireless communications network 100.

Action 805

After the determination in Action 804, the wireless device 121 may transmit the determined one or more channel state measurement reports in the wireless communications network 100.

Example of embodiments of a method performed by a network node 110 for enabling a wireless device 121 to determine channel state measurements in a wireless communications network 100 will now be described with reference to the flowchart depicted in FIG. 9. FIG. 9 is an illustrated example of actions or operations which may be taken by a network node 110 in the wireless communication network 100. The method may comprise the following actions.

Action 901

First, the network node 110 determines information indicating how to combine at least two channel state measurements into at least one combined channel state measurement in the wireless device 121, wherein the at least two channel state measurements are obtained by the wireless device 121 on measurement resources allocated by the network node 110 for the at least two channel state measurements. In some embodiments, the at least one combined channel state measurement may be a channel state measurement for interference estimation. In some embodiments, at least one of the at least two channel state measurements may be a channel state measurement for channel estimation, and at least one of the at least two channel state measurements may be a channel state measurement for interference estimation. In some embodiments, the measurement resources allocated to the at least one of the at least two channel state measurements that is a channel state measurement for channel estimation may be Channel State Information-Reference Symbol, CSI-RS, resources in the wireless communications network 100, and the measurement resources allocated to the at least one of the at least two channel state measurements that is channel state measurements for interference estimation may be Channel State Information-Interference Measurement, CSI-IM, resources in the wireless communications network 100. In some embodiments, the network node 110 may determine pre-coders and probability distributions for each of the at least one of the at least two channel state measurements that is a channel state measurement for interference estimation.

In some embodiments, the at least two channel state measurements may be part of the same channel state measurement process. The same channel state measurement process may, according to some embodiments, be a Coordinated Multi-Point, CoMP, process, a process for performing a joint precoding decision, or a process for beamforming.

Action 902

After determining the information in Action 901, the network node 110 transmits the determined information to the wireless device 121 in the wireless communications network 100. In some embodiments, this may, for example, enable the wireless device 121 to determine accurate interference contributions from different network nodes, beams or antennas on transmissions from the network node 110 to the wireless device 121 in the wireless communications network 100. In some embodiments, this may, for example, enable the wireless device 121 to determine accurate joint transmission channel state measurement from multiple network nodes of transmissions to the wireless device 121 in the wireless communications network 100.

Action 903

After transmitting the information in Action 902, the network node 110 may receive one or more channel state measurement reports from the wireless device 121 based on the at least one combined channel state measurement. In some embodiments, this means, for example, that the network node 110 may receive one or more report from the wireless device 121 which accurately reflects the interference contributions from different network nodes, beams or antennas on transmissions from the network node 110 to the wireless device 121 in the wireless communications network 100. In some embodiments, this means, for example, that the network node 110 may receive one or more report from the wireless device 121 which comprise accurate joint transmission channel state measurement from multiple network nodes of transmissions to the wireless device 121 in the wireless communications network 100.

For the purpose of illustrating some of the above described embodiments, an example of a CoMP scenario is shown in FIG. 10. In this CoMP scenario example, it is assumed that there are three network nodes 110, 111, 112 forming a coordinated cluster that is configured to perform CoMP transmissions to the wireless device 121 in a wireless communications network 100. This may also be referred to herein as a CoMP cluster. It should here be noted that the number of networks node in such CoMP cluster may be any feasible number, and three is only used here as an illustrative example.

According to some embodiments, in order to obtain accurate CSI feedback for a transmission from one of the three network nodes 110, 111, 112, such as, e.g. the network node 110, to the wireless device 121, the wireless device 121 may here be configured with one CSI process, i.e. one channel state measurement process, that is dedicated for CoMP. This may be compared to configuring the wireless device 121 with four different CSI processes with different CSI-IM measurement resources and a common CSI-RS measurement resource as described in an earlier example above. In some embodiments, the CSI process dedicated for CoMP may utilize:

a CSI-RS measurement resource for channel estimation of the channel towards the one of the network nodes 110, 111, 112 for which a transmission to the wireless device 121 is to be made, i.e. the network node 110. In reference to the above described methods, this CSI-RS measurement resource may be a resource on which a channel state measurement for channel estimation is obtained by the wireless device.

two CSI-IM measurement resources used for interference estimation of the interference contribution from the other two network nodes, i.e. the network nodes 111, 112, respectively. In reference to the above described methods, these CSI-IM measurement resources may be resources on which a channel state measurement for interference estimation is obtained by the wireless device. These CSI-IM measurement resources may also be referred to herein as CoMP CSI-RS measurement resources, since these CSI-IM measurement resources are used to perform channel estimations on reference signals which channel estimations are then used to determine the channel state measurements, e.g. CSI channel state measurements for interference estimation.

a CSI combining indicator indicating how the interference estimations from the two CSI-IM measurement resources are to be combined. In reference to the above described methods, this CSI combining indicator may be the received information which indicates how the wireless device 121 is to combine the obtained at least two channel state measurements into at least one combined channel state measurement.

a CSI-IM measurement resource for interference estimation of interference contribution from network nodes outside the CoMP cluster, i.e. network nodes other than the network nodes 110, 111, 112. In reference to the above described methods, this CSI-IM measurement resource may be a resource on which a channel state measurement for interference estimation is obtained by the wireless device.

Hence, through the CSI process dedicated for CoMP, the wireless device 121 is configured with one CSI-IM measurement resource for estimating the interference contribution from each one of the interfering network nodes 111, 112 within the CoMP cluster.

In some embodiments, the CSI-IM here used for interference estimation of the interference contribution from the network nodes 111, 112 may coincide with the CSI-RS measurement resource that other wireless devices (not shown) being served by the network node 111 use for their channel estimation with respect to the network node 111. Similarly, the CSI-IM measurement resource here used for interference estimation of the interference contribution from the network nodes 111, 112 may coincide with the CSI-RS measurement resource that other wireless devices (not shown) being served by the network node 112 use for their channel estimation with respect to the network node 112.

In some embodiments, the received information indicating how the wireless device 121 is to combine the obtained at least two channel state measurements into at least one combined channel state measurement, i.e. the CSI combining indicator, may comprise a pre-coder set $P_i$ and probability distribution $p_i$ for the CoMP CSI-RS i. The set $$P_i = \{P_{i1}, P_{i2}, \ldots, P_{iM_i}\}$$

of pre-coders, which typically may be of one or more ranks, is associated with a probability in the probability distribution $$p_i = \{p_{i1}, p_{i2}, \ldots, p_{iM_i}\}.$$

This enables the wireless device 121 to determine:
- a pre-coded interference covariance matrix $Q_2$ for the interference contribution from the network node 111; and
- a pre-coded interference covariance matrix $Q_3$ for the interference contribution from network node 112.

The wireless device 121 may then determine a pre-coded interference covariance matrix, $Q_{i,j}$:

$$Q_{ij} = H_i P_{ij} P_{ij}^* H_i^*,$$

wherein $H_i$ is the channel estimate for the network node i, and $P_{ij}$ is a pre-coder in $P_i$.

Furthermore, from the CSI-IM for interference estimation of interference contribution from network nodes outside the CoMP cluster, the wireless device 121 may determine a noise and inter-cluster interference covariance matrix $Q_{I+N}$.

The wireless device 121 may hence from the two CoMP CSI-RSs and the CSI-IM measurement resource for interference estimation of interference contribution from network nodes outside the CoMP cluster determine the following pre-coded CoMP interference covariance matrices:

- $Q_{k,l} = Q_{2k} + Q_{3l} + Q_{I+N}$, which is the interference contribution from the network node 111 with pre-coder $P_{2k}$ and from the network node 112 with pre-coder $P_{3l}$;
- $Q_k = Q_{2k} + Q_{I+N}$, which is the interference contribution from the network node 111 with pre-coder $P_{2k}$ when the network node 112 is silent, i.e. muted;
- $Q_l = Q_{3l} + Q_{I+N}$, which is the interference contribution from the network node 112 with pre-coder $P_{3l}$ when the network node 111 is silent, i.e. muted;
- $Q = Q_{I+N}$, which is the interference contribution when both the network node 111 and the network node 112 are silent, i.e. muted.

Above, for the sake of simplicity, "2" refers to network node 111 and "3" refers to network node 112.

This means that the wireless device 121 may autonomously determine the 4 different CSI hypothesis without, for example, having to be configured by the network node 110 with four different CSI processes with different CSI-IM measurement resources and a common CSI-RS measurement resource as described in the example in the beginning of the description above.

Furthermore, the embodiments above also save CSI-RS measurement resources since they enables the CoMP cluster to utilize a common CSI-IM for estimation of inter-cluster interference, and one CSI-RS for both channel estimation and intra-cluster interference estimation. This means that the solution according to the embodiments herein scales well with larger CoMP cluster sizes, since the number of required CSI-RS measurement resources here scales linearly with the CoMP cluster size. This compared to the exponential scaling according to the solution as described in the similar example in the background above.

The wireless device 121 may further, based on the set of pre-coders and their associated probabilities as described above, determine an expected performance, that is, a CSI, for each one of the four different CSI hypothesis.

For example, in case the wireless device 121 has a measured channel $H_1$ with respect to the network node 110 and experience interference contributions from the network node 111 and the network node 112 as described above, the wireless device 121 may determine the mutual information, MI:

$$MI = \sum_{k=1}^{M_1} \sum_{i=1}^{M_2} p_{2k} p_{2i} MI(H_2, Q_{k,i}),$$

wherein $MI(H_1, Q_{k,i})$ is the mutual information for a transmission from the network node 110 to the wireless device 121 given pre-coded interference from the network node 111 with pre-coder $P_{2k}$ and pre-coded interference from the network node 112 with pre-coder $P_{3l}$.

Note that the pre-coder choice used by the network node 111 and the network node 112 are here assumed to be mutually independent.

However, in some embodiments, the CSI combining indicator may be a set of pre-coder tuples and a set of joint probabilities for each of the pre-coder tuples. In some embodiments, the CSI combining indicator may also be a set of rank-tuples and rank probabilities, wherein the wireless device 121 assumes that the pre-coders for a given rank are equally probable.

While the CoMP scenario describes interference occurring in between cells of different network nodes in a CoMP cluster, the same principles may also be applied to perform a joint precoding decision by a network node 110 in the same cell, i.e. a joint precoding decision for a transmission from the network node 110 to the wireless device 121 in the cell 115.

In this case, however, the configuration of CSI-RS measurement resources will be assumed to more closely correlate with the experienced channel for the transmission. This means that the embodiments described above for the CoMP may be implemented also for MU-MIMO scheduling decisions, such as, e.g. intra-cell MU-MIMO interference and joint pre-coder choice for multiple wireless devices.

According to one example, a joint pre-coder choice by a network node 110 may be implemented by assigning one CSI hypothesis to the wireless device 121 in which the wireless device 121 do not assume any interference, and one CSI hypothesis where the wireless device 121 assumes a pre-coder that is used by one or multiple co-scheduled wireless devices. This will provide the network node 110 with information about the best pre-coder choice for the MU-MIMO and how badly the wireless device 121 is interfered by the co-scheduled wireless devices.

Two different examples of how this may be further implemented are presented below.

According to a first example, consider a network node 110 with N antenna elements and N antenna ports. Since each wireless device supports single-layer transmission, the network node 110 may support MU-MIMO with up to N number of wireless devices. Further, assume that the network node 110 is currently serving two wireless devices with optimized beams using the pre-coders $p_1$ and $p_2$, respectively. As the network node 110 discovers a new wireless device 121 to serve, the network node 110 needs to determine an optimized beam for this new wireless device 121 which takes into account the interference from the previous two wireless devices.

The network node 110 may then configure the wireless device 121 with an N-port CSI-RS, which e.g. may be the same as for the previous two wireless devices, and three CSI-IMs; wherein of the three CSI-IMs, two may coincide with the CSI-RS and one may be used for estimation of thermal noise and non-beam interference. In this example, the CSI combining indication may indicate that for the two CSI-IMs coinciding with the CSI-RS, the wireless device 121 should assume the two interfering pre-coders $p_1$ and $p_2$.

The wireless device 121 may then estimate the channel H from the CSI-RS, and the thermal noise and covariance matrix $Q_{I+N}$.

The wireless device 121 may then also determine an interference covariance matrix:

$$Q = HP_1 P^*_1 H^* + P_2 P^*_2 H^*_2 + Q_{I+N}$$

to be used when selecting a pre-coder, $p_3$. This may then be reported to the network node 110. The network node 110 may then uses the pre-coders $P_1$, $P_2$ and $P_3$ for the previous two wireless devices and the new wireless device, respectively.

The network node 110 may also update the CSI combining indication for the previous two wireless devices to assume interference contribution from using also $p_3$ for the new wireless device. In some embodiments, the pre-coders $p_1$ and $p_2$ may be associated with power-scaling, or comprise power-scaling, to reflect UE-specific power control.

According to a second example, consider a network node 110 which supports eight beam directions and where each beam may be optimized using a pre-coder from a set of pre-coders. Each beam direction may be associated with a pre-coded, i.e. beam pre-coder, CSI-RS. Assume that the network node is currently serving two wireless devices with optimized beams in beam direction CSI-RS 1 and CSI-RS 2. As the network node 110 discovers a new wireless device to serve, the network node 110 needs to determine an optimized third beam for this new wireless device 121 which takes into account the interference from the previous two wireless devices, i.e. all three wireless device needs to be MU-MIMO scheduled.

The network node 110 may then configure the wireless device 121 with six pre-coded CSI-RS 3-8 and three CSI-IMs; wherein of the three CSI-IMs, one may coincide with CSI-RS 1, one may coincide with CSI-RS 2, and the third one may be used for measuring thermal noise and other interference, i.e. interference from outside the beams. In this example, the CSI combining indication may indicate that for the CSI-IMs coinciding with CSI-RS 1 and CSI-RS 2, the wireless device 121 should assume the optimization pre-coders for the previous two wireless devices, respectively.

The wireless device 121 may also be instructed to evaluate each one of the CSI-RS 3-8 assuming the interference from the optimized beams and report an optimization pre-coder for the best beam corresponding to CSI-RS 3-8 back to the network node 110.

This means that with $H_i$ as channel estimate from CSI-RS i and optimization pre-coder $P_i$, i=1 ... 2, the wireless device 121 may assume the interference and noise covariance matrix:

$$Q = H_1 P_1 P^*_1 H^*_1 + H_2 P_2 P^*_2 H^*_2 + Q_{I+N}$$

when evaluating the CSI-RS 3-8.

The matrix $Q_{I+N}$ is the noise and interference covariance matrix for the CSI-IM estimating thermal noise and other non-beam interference. The network node 110 may then form a beam according to the report from the wireless device 121 as the third beam and then update the reporting of the previous two wireless devices to assume interference in the third beam.

In some embodiments, co-schedulable beams for a network node 110 comprising enhanced multi-antennas may also employ the same principles as described in the embodiments above for the CoMP scenario and the joint precoding decision.

For example, the network node 110 may precode CSI-RS measurement resources for its enhanced multi-antennas. In this case, in some embodiments, the network node 110 may assign a CSI-RS measurement resource to a beam and the wireless device 121 may be configured with one or more CSI processes to monitor the performance for one or more beams. Here, the network node 110 may advantageously obtain information about which beams are suitable to co-schedule and which beams are not good to use simultaneously.

Hence, in some embodiments, the wireless device 121 may be configured with one CSI-RS for a particular beam, and then two or more CSI-IMs, where one of these CSI-IMs is to be used for measuring noise and interference being non-beam originated and where other one or more CSI-IMs may be used to measure beam-specific interference. Thus, the wireless device 121 may estimate the performance of the particular beam given that no other beam is interfering, but also any combination of other interfering beams.

In some embodiments, the wireless device 121 may be configured with an offset parameter $\Delta$ and provided with instructions to report a list of interfering beams, such as, the resulting performance, e.g. in terms of mutual information, is degraded less than the offset parameter $\Delta$ compared to when no beam is interfering. For example, if no other beam is interfering, then the estimated mutual information may be MI_0. It there are other interfering beams, then the estimated mutual information will be lower than MI_0. In this embodiment, the wireless device may report a list of interfering beams such that the estimated mutual information MI, assuming the interfering beams in the list, fulfils MI>MI_0−$\Delta$. Hence, the wireless device will reports a list of beams that may be interfering with a performance degradation at most $\Delta$ compared to when no beam is interfering.

It should be noted that according to the embodiments herein, the current CSI processes are advantageously extended with multiple CSI-RS and CSI-IM resources and with an instruction how the obtained measurements on these resources are to be combined to form new combined interference measurements. As described above, in some embodiments, the combination may be implemented by assigning signal and/or interference pre-coders for the wireless device 121 to report on. This implies that a pre-coder represents the interference situation for one or multiple data streams to one or multiple co-scheduled wireless devices, either in the same or different cells.

The embodiments herein advantageously provides improved support for CSI measurement procedures in wireless communications networks with large CoMP clusters and/or with network nodes/wireless devices with large number of antennas. Implementing the embodiments herein will result in higher user throughputs, lower packet delays, and enhanced system capacity in the wireless communications network.

Furthermore, the embodiments herein advantageously also allows for much better link adaptation decisions by the network node 110 by having channel state measurement representing more closely the actual transmissions in terms of spatial and correlation properties; for which properties current solutions may give tens of dB errors in the link adaptation due to the limited knowledge about the experienced instantaneous channel for a wireless device 121.

Figure 11:
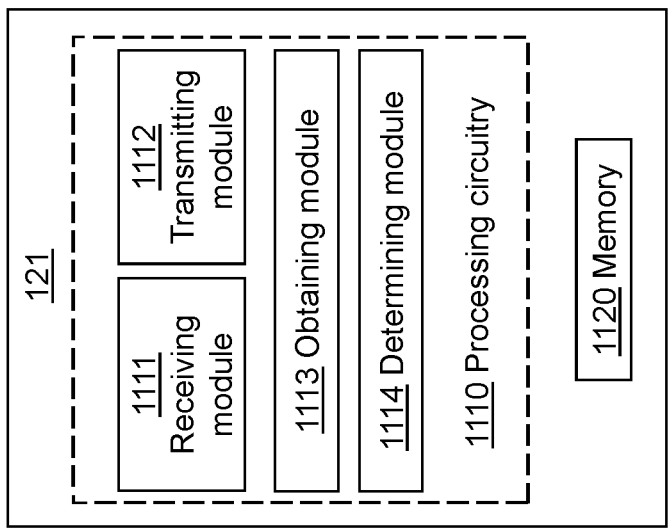
FIG. 11 is a block diagram depicting embodiments of a wireless device.

To perform the method actions in the wireless device 121 for determining channel state measurements in a wireless communications network 100, the wireless device 121 may comprise the following arrangement depicted in FIG. 11.

FIG. 11 shows a schematic block diagram of embodiments of a wireless device 121. The embodiments of the wireless device 121 described herein may be considered as independent embodiments or may be considered in any combination with each other to describe non-limiting examples of the example embodiments described herein.

The wireless device 121 may comprise processing circuitry 1110, a memory 1120 and at least one antenna (not shown). The processing circuitry 1110 may also comprise a receiving module 1111 and a transmitting module 1112. The receiving module 1111 and the transmitting module 1112 may comprise Radio Frequency, RF, circuitry and baseband processing circuitry. In particular embodiments, some or all of the functionality described above as being performed by the wireless device 121 may be provided by the processing circuitry 1110 executing instructions stored on a computer-readable medium, such as the memory 1120 shown in FIG. 11. Alternative embodiments of the wireless device 121 may comprise additional components, such as, the obtaining module 1113 and the determining module 1114, each responsible for providing its respective functionality necessary to support the embodiments described herein.

The wireless device 121 or processing circuitry 1110 is configured to, or may comprise the obtaining module 1113 configured to, obtain at least two channel state measurements performed by the wireless device 121 on measurement resources allocated for the at least two channel state measurements. Also, the wireless device 121 or processing circuitry 1110 is configured to, or may comprise the receiving module 1111 configured to, receive information indicating how the wireless device 121 is to combine the obtained at least two channel state measurements into at least one combined channel state measurement. Furthermore, the wireless device 121 or processing circuitry 1110 is configured to, or may comprise the determining module 1114 configured to, determine at least one combined channel state measurement based on the received information and the obtained at least two channel state measurements.

In some embodiments, the wireless device 121 or processing circuitry 1110 may further be configured to, or may comprise the determining module 1114 being configured to, determine one or more channel state measurement reports based on the at least one combined channel state measurement. In this case, according to some embodiments, the wireless device 121 or processing circuitry 1110 may also be configured to, or may comprise the refraining module 1112 being configured to, transmit the determined one or more channel state measurement reports in the wireless communications network 100.

In some embodiments, the at least one combined channel state measurement is a channel state measurement for interference estimation. In some embodiments, at least one of the obtained at least two channel state measurements is a channel state measurement for channel estimation, and at least one of the obtained at least two channel state measurements is a channel state measurement for interference estimation. In some embodiments, the received information indicate pre-coders and probability distributions for each of the at least one of the obtained at least two channel state measurements that is a channel state measurement for interference estimation. In some embodiments, the measurement resources allocated to the at least one of the obtained at least two channel state measurements that is a channel state measurement for channel estimation are Channel State Information-Reference Symbol, CSI-RS, resources in the wireless communications network 100, and the measurement resources allocated to the at least one of the obtained at least two channel state measurements that is a channel state measurement for interference estimation are Channel State Information-Interference Measurement, CSI-IM, resources in the wireless communications network 100. In some embodiments, the obtained at least two channel state measurements are part of the same channel state measurement process.

Furthermore, the embodiments of the wireless device 121 for determining channel state measurements in a wireless communications network 100 described above may be implemented through one or more processors, such as the processing circuitry 1110 in the wireless device 121 depicted in FIG. 11, together with computer program code for performing the functions and actions of the embodiments herein. The program code mentioned above may also be provided as a computer program product, for instance in the form of a data carrier, such as, e.g. an electronic signal, optical signal, radio signal, or computer-readable storage medium, carrying computer program code or code means for performing the embodiments herein when being loaded into the processing circuitry 1110 in the wireless device 121. The computer program code may e.g. be provided as pure program code in the wireless device 121 or on a server and downloaded to the wireless device 121.

Those skilled in the art will also appreciate that the processing circuitry 1110 and the memory 1120 described above may refer to a combination of analog and digital circuits, and/or one or more processors configured with software and/or firmware, e.g. stored in a memory, that when executed by the one or more processors such as the processing circuitry 1120 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Hence, in other words, various embodiments of the wireless device 121 may be set out by the following statements:

A wireless device 121 for determining channel state measurements in a wireless communications network 100, the wireless device 121 comprising an obtaining module 1113 for obtaining an at least two channel state measurements performed by the wireless device 121 on measurement resources allocated for the at least two channel state measurements, a receiving module 1111 for receiving information indicating how the wireless device 121 is to combine the obtained at least two channel state measurements into at least one combined channel state measurement, and a determining module 1114 for determining at least one combined channel state measurement based on the received information and the obtained at least two channel state measurements.

A wireless device may be a wireless device 121 for determining channel state measurements in a wireless communications network 100, the wireless device 121 comprising a receiver 1111, a processor 1110 and a memory 1120, said memory 1120 containing instructions executable by said processor 1110 whereby said wireless device 121 is configured to obtain at least two channel state measurements performed by the wireless device 121 on measurement resources allocated for the at least two channel state measurements, receive information indicating how the wireless device 121 is to combine the obtained at least two channel state measurements into at least one combined channel state measurement, and determine at least one combined channel state measurement based on the received information and the obtained at least two channel state measurements.

It should be noted that the modules of the wireless device 121 may in some embodiments be implemented as computer programs stored in memory, e.g. in the memory modules 1120 in FIG. 11, for execution by processors, e.g. the processing modules 1110 of FIG. 11.

Figure 12:
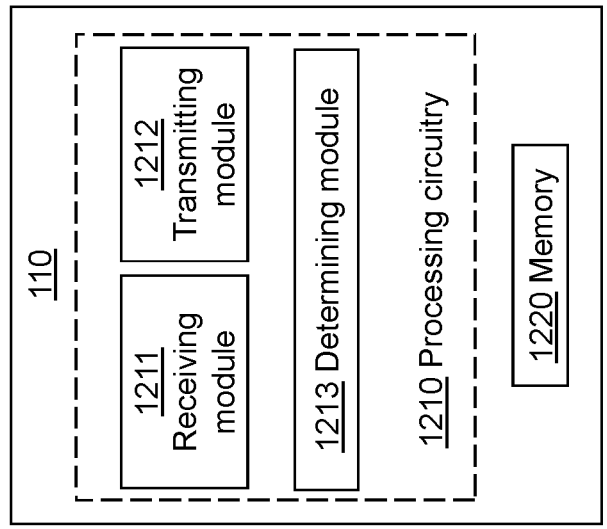
FIG. 12 is a block diagram depicting embodiments of a network node.

To perform the method actions in the network node 110 for enabling a wireless device 121 to determine channel state measurements in a wireless communications network 100, the network node 110 may comprise the following arrangement depicted in FIG. 12. FIG. 12 shows a schematic block diagram of embodiments of a network node 110. The embodiments of the network node 110 described herein may be considered as independent embodiments or may be considered in any combination with each other to describe non-limiting examples of the example embodiments described herein.

The network node 110 may comprise a processing circuitry 1210, a memory 1220 and at least one antenna (not shown). The processing circuitry 1210 may comprise a receiving module 1211 and a transmitting module 1212. The receiving module 1211 and the transmitting module 1212 may comprise Radio Frequency, RF, circuitry and baseband processing circuitry. In particular embodiments, some or all of the functionality described above as being performed by the network node 110 may be provided by the processing circuitry 1210 executing instructions stored on a computer-readable medium, such as the memory 1220 shown in FIG. 12. Alternative embodiments of the wireless device 121 may comprise additional components, such as, the determining module 1213 responsible for providing its functionality necessary to support the embodiments described herein.

The network node 110 or processing circuitry 1210 is configured to, or may comprise the determining module 1213 configured to, determine information indicating how to combine at least two channel state measurements into at least one combined channel state measurement in the wireless device 121, wherein the at least two channel state measurements are obtained by the wireless device 121 on measurement resources allocated by the network node 110 for the at least two channel state measurements. Also, the network node 110 or processing circuitry 1210 is configured to, or may comprise the transmitting module 1212 configured to, transmit the determined information to the wireless device 121 in the wireless communications network 100.

In some embodiments, network node 110 or processing circuitry 1210 may be configured to, or may comprise the receiving module 1211 being configured to, receive one or more channel state measurement reports from the wireless device 121 based on the at least one combined channel state measurement.

In some embodiments, the at least one combined channel state measurement is a channel state measurement for interference estimation. In some embodiments, at least one of the at least two channel state measurements is a channel state measurement for channel estimation, and at least one of the at least two channel state measurements is a channel state measurement for interference estimation. In some embodiments, the measurement resources allocated to the at least one of the at least two channel state measurements that is a channel state measurement for channel estimation are Channel State Information-Reference Symbol, CSI-RS, resources in the wireless communications network 100, and the measurement resources allocated to the at least one of the at least two channel state measurements that is channel state measurements for interference estimation are Channel State Information-Interference Measurement, CSI-IM, resources in the wireless communications network 100. In some embodiments, the at least two channel state measurements are part of the same channel state measurement process.

In some embodiments, the network node 110 or processing circuitry 1210 may be configured to, or may comprise the determining module 1211 being configured to, determine the information by determining pre-coders and probability distributions for each of the at least one of the at least two channel state measurements that is a channel state measurement for interference estimation.

Furthermore, the embodiments of the network node 110 for enabling the wireless device 121 to determine channel state measurements in a wireless communications network 100 described above may be implemented through one or more processors, such as the processing circuitry 1210 in the network node 110 depicted in FIG. 12, together with computer program code for performing the functions and actions of the embodiments herein. The program code mentioned above may also be provided as a computer program product, for instance in the form of a data carrier, such as, e.g. an electronic signal, optical signal, radio signal, or computer-readable storage medium, carrying computer program code or code means for performing the embodiments herein when being loaded into the processing circuitry 1210 in the network node 110. The computer program code may e.g. be provided as pure program code in the network node 110 or on a server and downloaded to the network node 110.

Those skilled in the art will also appreciate that the processing circuitry 1210 and the memory 1220 described above may refer to a combination of analog and digital circuits, and/or one or more processors configured with software and/or firmware, e.g. stored in a memory, that when executed by the one or more processors such as the processing circuitry 1220 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Hence, in other words, various embodiments of the network node 110 may be set out by the following statements:

A network node 110 for enabling a wireless device 121 to determine channel state measurements in a wireless communications network 100, the network node 110 comprising a determining module 1213 for determining information indicating how to combine at least two channel state measurements into at least one combined channel state measurement in the wireless device 121, wherein the at least two channel state measurements are obtained by the wireless device 121 on measurement resources allocated by the network node 110 for the at least two channel state measurements, and a transmitting module 1212 transmit the determined information to the wireless device 121 in the wireless communications network 100.

A network node 110 for enabling a wireless device 121 to determine channel state measurements in a wireless communications network 100, the network node 110 comprising a transmitter 1212, a processor 1210 and a memory 1220, said memory 1220 containing instructions executable by said processor 1210 whereby said network node 110 is configured to determine information indicating how to combine at least two channel state measurements into at least one combined channel state measurement in the wireless device 121, wherein the at least two channel state measurements are obtained by the wireless device 121 on measurement resources allocated by the network node 110 for the at least two channel state measurements, and transmit the determined information to the wireless device 121 in the wireless communications network 100.

It should be noted that the modules of the network node 110 may in some embodiments be implemented as computer programs stored in memory, e.g. in the memory modules 1220 in FIG. 12, for execution by processors, e.g. the processing modules 1210 of FIG. 12.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments herein are not limited to the above described preferred embodiments. Various alternatives, modifications and equivalents may be used. Therefore, the above embodiments should not be construed as limiting.

Abbreviations

3GPP Third Generation Partnership Project
UMTS Universal Mobile Telecommunications System
GSM Global System for Mobile Communications
WCDMA Wideband Code Division Multiple Access
HSPA High Speed Packet Access
LTE Long Term Evolution
RAN Radio Access Network
UTRAN UMTS terrestrial RAN
E-UTRAN Evolved Universal Terrestrial Radio Access Network
RF Radio Frequency
RS Reference Symbols
CQI Channel-Quality Indicator
CRS Cell-Specific Reference Symbol
CSI Channel-State Information
CSI-IM CSI Interference Measurement
CSI-RS CSI Reference Symbol
LTE Long Term Evolution
MI Mutual Information
MIMO Multiple Input Multiple Output
PMI Pre-coding Matrix Indicator
PRB Physical Resource Block
RI Rank Indicator
RRC Radio Resource Control
TM Transmission Mode
UE User Equipment

The invention claimed is:

1. A method performed by a wireless device for determining channel state measurements in a wireless communications network, the method comprising:
    obtaining at least two channel state measurements performed by the wireless device on measurement resources allocated for the at least two channel state measurements where at least one of the obtained at least two channel state measurements is a channel state measurement for channel estimation, and at least one of the obtained at least two channel state measurements is a channel state measurement for interference estimation;
    receiving information indicating how the wireless device is to combine the obtained at least two channel state measurements into at least one combined channel state measurement where the received information indicates pre-coders and probability distributions for each of the at least one of the obtained at least two channel state measurements that is the channel state measurement for interference estimation; and
    calculating the at least one combined channel state measurement based on the received information and the obtained at least two channel state measurements, wherein the at least one combined channel state measurement is calculated by using the obtained at least two channel state measurements as input.

2. The method according to claim 1, further comprising:
    determining one or more channel state measurement reports based on the at least one combined channel state measurement; and
    transmitting the determined one or more channel state measurement reports in the wireless communications network.

3. The method according to claim 1, wherein the at least one combined channel state measurement is the channel state measurement for interference estimation.

4. The method according to claim 1, wherein the measurement resources allocated to the at least one of the obtained at least two channel state measurements that is the channel state measurement for channel estimation are Channel State Information-Reference Symbol, CSI-RS, resources in the wireless communications network, and the measurement resources allocated to the at least one of the obtained at least two channel state measurements that is the channel state measurement for interference estimation are Channel State Information-Interference Measurement, CSI-IM, resources in the wireless communications network.

5. The method according to claim 1, wherein the obtained at least two channel state measurements are part of a same channel state measurement process.

6. The method according to claim 5, wherein the same channel state measurement process is a Coordinated Multi-Point, CoMP, process.

7. The method according to claim 5, wherein the same channel state measurement process is a process for performing a joint precoding decision.

8. The method according to claim 5, wherein the same channel state measurement process is a process for beamforming.

9. A wireless device for determining channel state measurements in a wireless communications network, the wireless device is configured to:
    obtain at least two channel state measurements performed by the wireless device on measurement resources allocated for the at least two channel state measurements where at least one of the obtained at least two channel state measurements is a channel state measurement for channel estimation, and at least one of the obtained at least two channel state measurements is a channel state measurement for interference estimation,
    receive information indicating how the wireless device is to combine the obtained at least two channel state measurements into at least one combined channel state measurement where the received information indicates pre-coders and probability distributions for each of the at least one of the obtained at least two channel state measurements that is the channel state measurement for interference estimation, and
    calculate the at least one combined channel state measurement based on the received information and the obtained at least two channel state measurements, wherein the at least one combined channel state measurement is calculated by using the obtained at least two channel state measurements as input.

10. The wireless device according to claim 9, further configured to determine one or more channel state measurement reports based on the at least one combined channel state measurement, and transmit the determined one or more channel state measurement reports in the wireless communications network.

11. The wireless device according to claim 9, wherein the at least one combined channel state measurement is the channel state measurement for interference estimation.

12. The wireless device according to claim 9, wherein the measurement resources allocated to the at least one of the obtained at least two channel state measurements that is the channel state measurement for channel estimation are Channel State Information-Reference Symbol, CSI-RS, resources in the wireless communications network, and the measurement resources allocated to the at least one of the obtained at least two channel state measurements that is the channel state measurement for interference estimation are Channel State Information-Interference Measurement, CSI-IM, resources in the wireless communications network.

13. The wireless device according to claim 9, wherein the obtained at least two channel state measurements are part of a same channel state measurement process.

14. The wireless device according to claim 9, further comprising a processor and a memory, wherein the memory is containing instructions executable by the processor.

15. A method performed by a network node for enabling a wireless device to determine channel state measurements in a wireless communications network, the method comprising:
    determining information indicating how to combine at least two channel state measurements into at least one combined channel state measurement in the wireless device, wherein the at least two channel state measurements are obtained by the wireless device on measurement resources allocated by the network node for the at least two channel state measurements, the at least two channel state measurements are used to calculate the at least one combined channel state measurement, and at least one of the at least two channel state measurements is a channel state measurement for channel estimation, and at least one of the at least two channel state measurements is a channel state measurement for interference estimation, wherein the determining comprises determining pre-coders and probability distributions for each of the at least one of the at least two channel state measurements that is the channel state measurement for interference estimation; and
    transmitting the determined information to the wireless device in the wireless communications network.

16. The method according to claim 15, further comprising:
    receiving one or more channel state measurement reports from the wireless device based on the at least one combined channel state measurement.

17. The method according to claim 15, wherein the at least one combined channel state measurement is the channel state measurement for interference estimation.

18. The method according to claim 15, wherein the measurement resources allocated to the at least one of the at least two channel state measurements that is the channel state measurement for channel estimation are Channel State Information-Reference Symbol, CSI-RS, resources in the wireless communications network, and the measurement resources allocated to the at least one of the at least two channel state measurements that is the channel state measurements for interference estimation are Channel State Information-Interference Measurement, CSI-IM, resources in the wireless communications network.

19. The method according to claim 15, wherein the at least two channel state measurements are part of a same channel state measurement process.

20. A network node for enabling a wireless device to determine channel state measurements in a wireless communications network, the network node is configured to:
    determine information indicating how to combine at least two channel state measurements into at least one combined channel state measurement in the wireless device, wherein the at least two channel state measurements are obtained by the wireless device on measurement resources allocated by the network node for the at least two channel state measurements, the at least two channel state measurements are used to calculate the at least one combined channel state measurement, and at least one of the at least two channel state measurements is a channel state measurement for channel estimation, and at least one of the at least two channel state measurements is a channel state measurement for interference estimation, wherein the determining comprises determining pre-coders and probability distributions for each of the at least one of the at least two channel state measurements that is the channel state measurement for interference estimation, and transmit the determined information to the wireless device in the wireless communications network.

21. The network node according to claim 20, further configured to receive one or more channel state measurement reports from the wireless device based on the at least one combined channel state measurement.

22. The network node according to claim 20, wherein the at least one combined channel state measurement is the channel state measurement for interference estimation.

23. The network node according to claim 20, wherein the measurement resources allocated to the at least one of the at least two channel state measurements that is the channel state measurement for channel estimation are Channel State Information-Reference Symbol, CSI-RS, resources in the wireless communications network, and the measurement resources allocated to the at least one of the at least two channel state measurements that is the channel state measurements for interference estimation are Channel State Information-Interference Measurement, CSI-IM, resources in the wireless communications network.

24. The network node according to claim 20, wherein the at least two channel state measurements are part of a same channel state measurement process.

25. The network node according to claim 20, further comprising a processor and a memory, wherein the memory is containing instructions executable by the processor.

* * * * *